Figure 1:
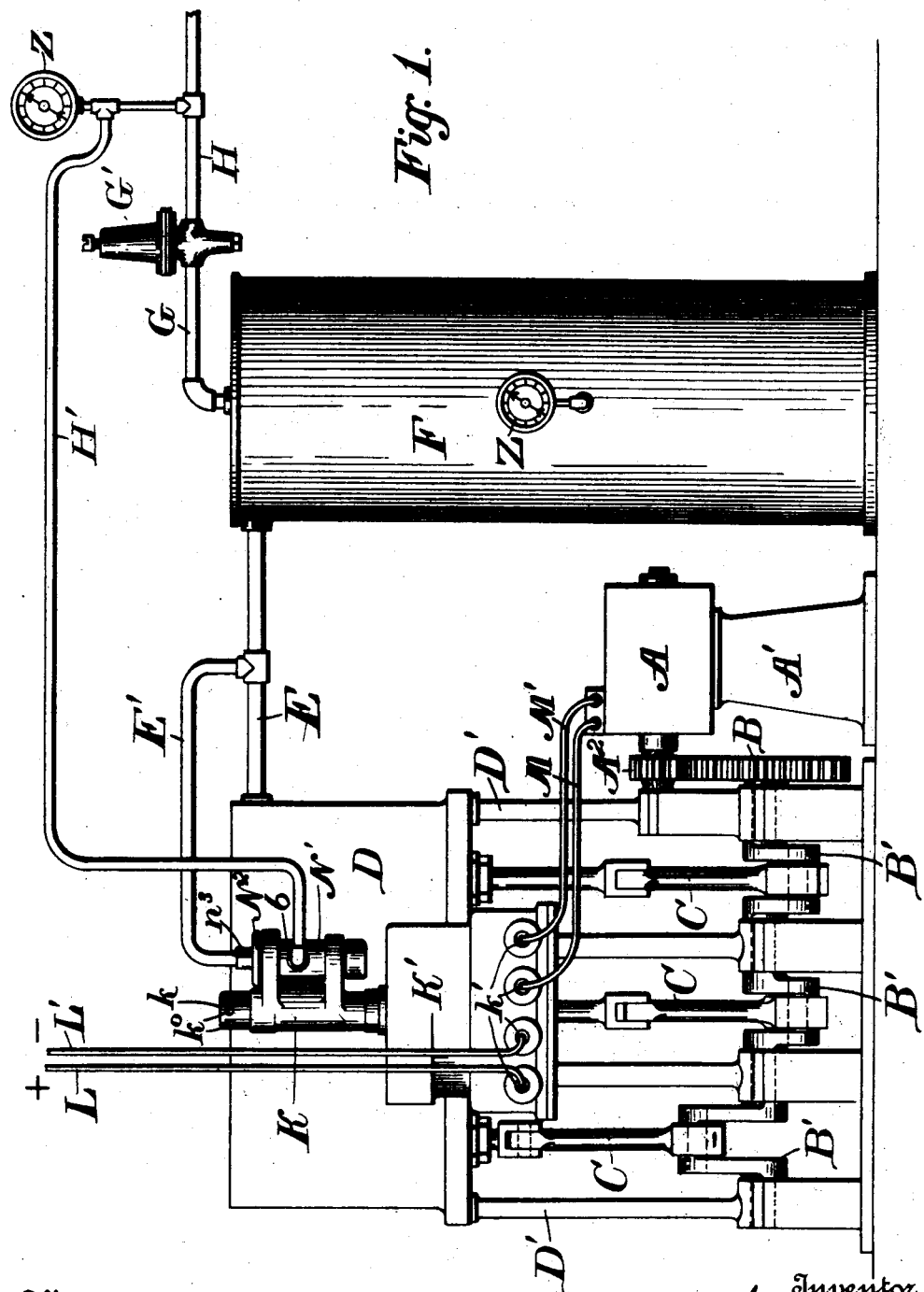

No. 681,625. Patented Aug. 27, 1901.
W. B. COWLES.
AUTOPNEUMATIC REGULATOR FOR MOTORS.
(Application filed May 26, 1901.)
(No Model.) 3 Sheets—Sheet 1.

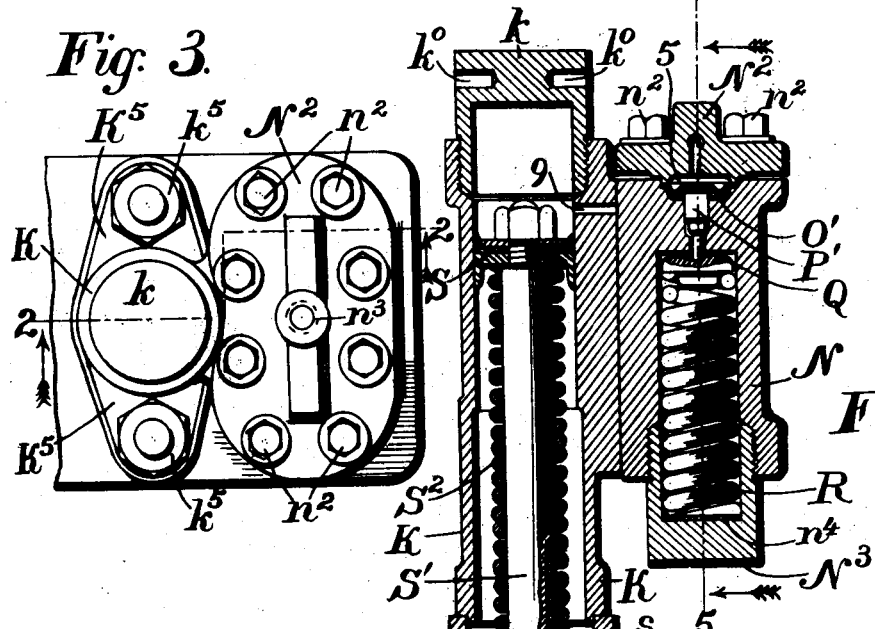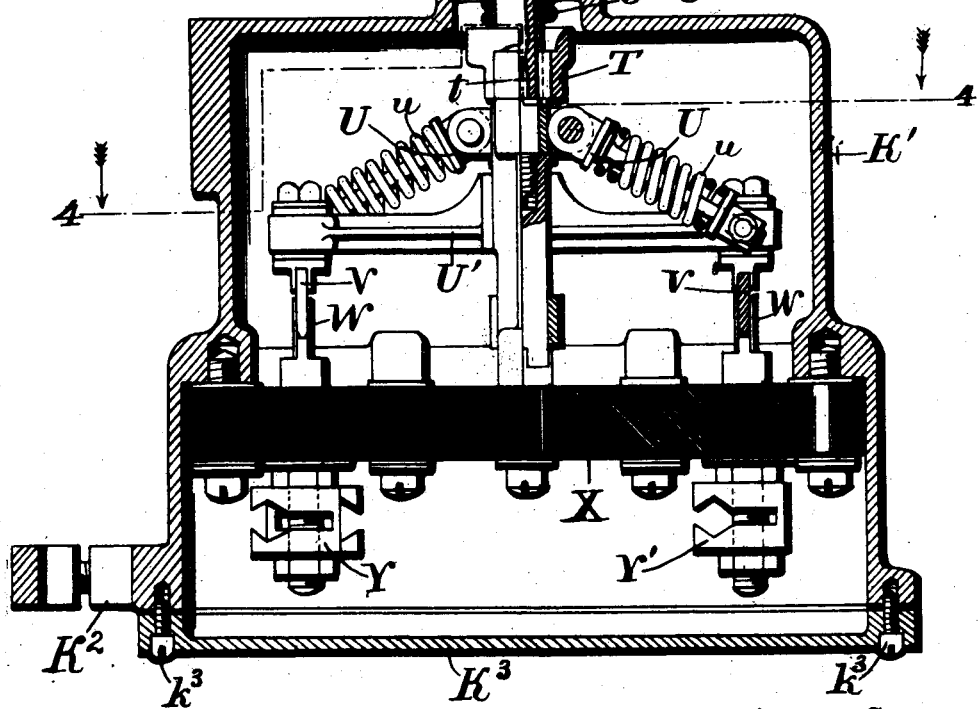

No. 681,625. Patented Aug. 27, 1901.
W. B. COWLES.
AUTOPNEUMATIC REGULATOR FOR MOTORS.
(Application filed May 28, 1901.)
(No Model.) 3 Sheets—Sheet 3.
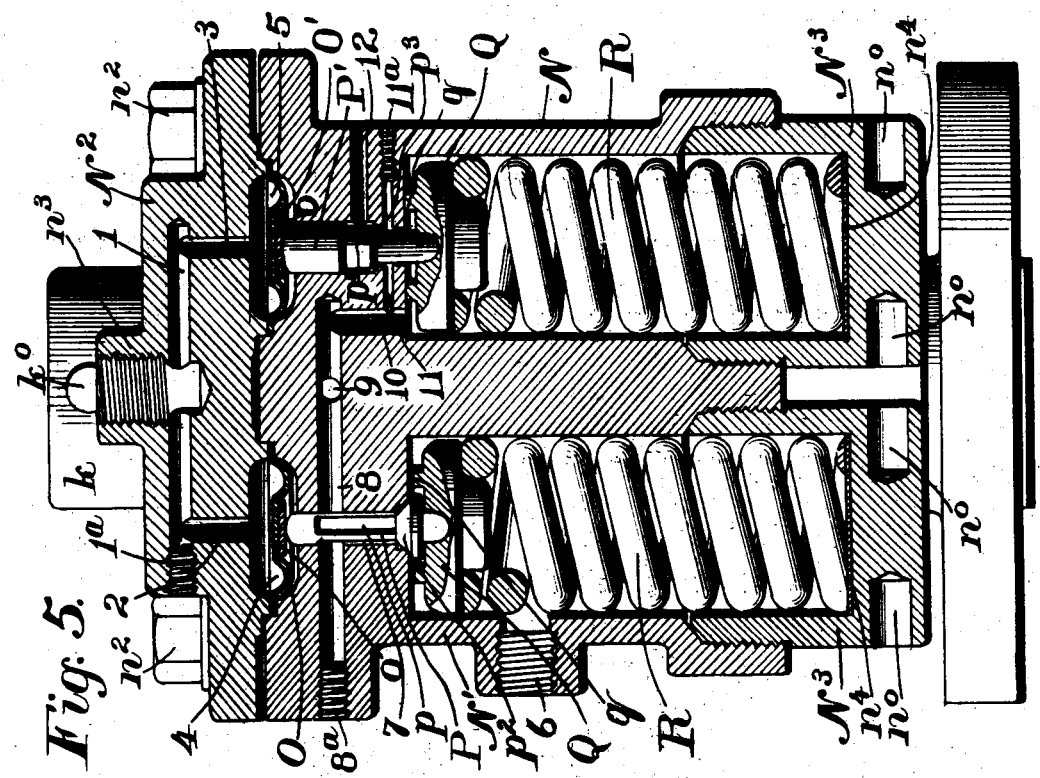
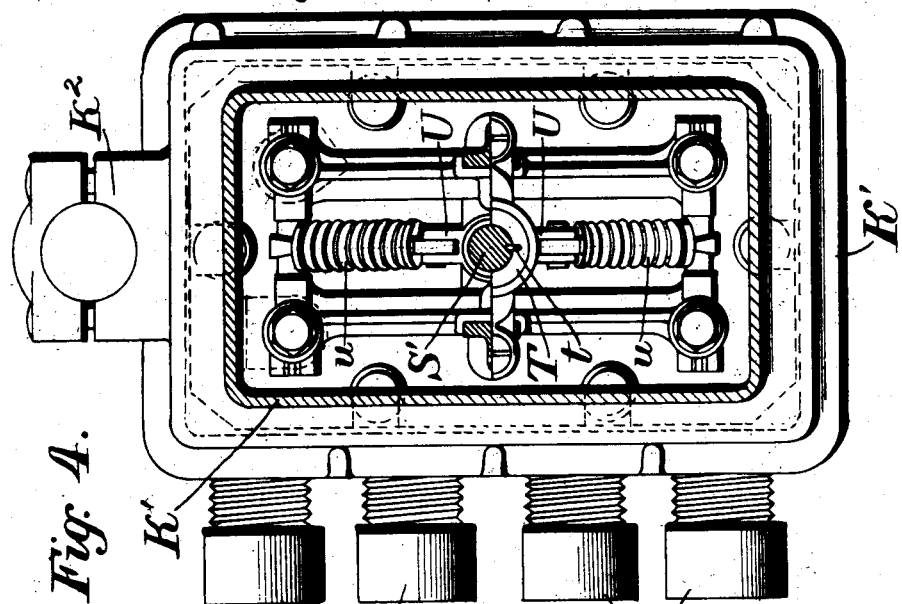
Witnesses
Inventor
W. B. Cowles
by Wilkinson & Fisher,
Attorneys.

UNITED STATES PATENT OFFICE.

WILLIAM BARNUM COWLES, OF CLEVELAND, OHIO, ASSIGNOR TO THE LONG ARM SYSTEM COMPANY, OF SAME PLACE.

AUTOPNEUMATIC REGULATOR FOR MOTORS.

SPECIFICATION forming part of Letters Patent No. 681,625, dated August 27, 1901.

Application filed May 28, 1901. Serial No. 62,293. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Autopneumatic Regulators for Motors; and I do hereby declare the following to be a full, clear, and exact description of the invention, such as will enable others skilled in the art to which it appertains to make and use the same.

My invention relates to improvements in fluid-pressure systems in which it is desired to compress air or other gas and to maintain the same in a stored-up condition at approximately a predetermined pressure; and this invention relates more particulary to means by which a motor or motors driving the compressor are automatically started when the pressure falls below the predetermined limit and are automatically stopped when the pressure rises above a predetermined limit or a signal is made to indicate that the limit of pressure has been reached.

In ordinary practice the stiffness of working of the parts would cause the minimum pressure in the receiver or main reservoir to differ from the maximum to such an extent that the mechanism hereinafter described would not be started or stopped by trifling changes in pressure. Thus in the system devised by me and shown in my United States Patents No. 631,698, granted August 27, 1899, and No. 656,947, granted August 28, 1900, to which my present invention is particularly applicable, I adjust the parts so that the minimum pressure in the receiver may be about eight hundred and fifty pounds and the maximum pressure about one thousand pounds to the square inch, and the invention is usually adjusted to operate within those limits.

My present invention therefore relates to an electric switch which is automatically operated by the rise and fall of pressure in the main reservoir or receiver which connects the electric motor for driving the compressor to the circuit from the generator or cuts it out of circuit when the pressure falls below or rises above the predetermined limits, respectively.

Reference is had to the accompanying drawings, in which the same parts are indicated by the same characters throughout the several views.

Figure 1 shows diagrammatically the receiver or main reservoir, the electric motor and compressor, the pipe connections for the air, and also the casing for the autopneumatic switch and the electric connections to the motor. Fig. 2 shows a section through the casing containing the switch and the spring-chambers and inclosed mechanism by means of which the switch is operated, parts being shown in elevation. Fig. 3 is a plan view of the upper part of the casing containing the operating-cylinder and spring-chambers. Fig. 4 represents the section along the broken line 4 4 of Fig. 2 and looking down, and Fig. 5 represents an enlarged sectional view along the line 5 5 of Fig. 2 and looking in the direction of the arrows.

A represents an electric motor for driving the compressor, which is mounted on any suitable support A'. On the armature-shaft of the motor is a pinion $A^2$, meshing with the gear-wheel B on the shaft carrying the cranks B'. These cranks are joined by the connecting-rods C to the piston-rods of the pistons working in the cylinders of the compressor D, which compressor may be mounted on a suitable support D'. The number of these cylinders may be varied at will, and any form of compressor operated by an electric motor may be adopted, if desired. The compressor D is connected by means of the pipe E to the reservoir F, from which fluid-pressure is delivered by means of the pipe G passing through one or more reducing-valves G' to the main supply-pipe H. This pipe H is connected by means of the pipe H' to the opening 6 in the spring-chamber N' below the valve P', thus admitting a reduced or working fluid-pressure to the under side of said valve. The full pressure of the fluid in the receiver is transmitted by means of the pipe E' to the opening $n^3$ at the top of the two spring-chambers N and N' and passes through the passages 1, 2, and 3 to the diaphragm-chambers 4 and 5, in which the diaphragms O and O' are mounted. Underneath these diaphragms are the small bearing-plates $o$, which rest on top of the valves P and P'. The valve P is normally pressed upward on its seat $p^2$ by means of the spring R pressing upward on the block Q, which block finds a bearing $q$ (not a tight joint) when the valve is just on its seat, and thus insures the alinement and action of the spring when seating the valve. The stem of this valve is provided with one or more longitudinal grooves $p$ (see Fig. 5) to permit the passage therethrough of any air that passes upward by the valve-seat $p^2$. The valve P' is shouldered, as at $p'$, and is normally pressed off its seat $p^3$ by means of its block Q, which is operated by its spring R precisely like the other block Q already described. The cap $N^2$ is held in place by means of the bolts $n^2$, and the lower ends of the two chambers N and N' are closed with screw caps or heads $N^3$, which may be screwed up to adjust the tension on the spring R by a spanner-wrench inserted in the sockets $n^0$. To further facilitate the adjustment of the springs R, washers $n^4$ may be provided. The passages 1 and 8 for convenience of manufacture may be bored in from one side of the casting and then the ends closed with screw-plugs $1^a$ and $8^a$, as shown in Fig. 5. The passage 8 is connected with the upper end of the cylinder K by means of the passage 9. The cylinder is preferably closed by a screw-head $k$, which may be screwed in place by capstan-bars or a spanner-wrench inserted in the sockets $k^0$. The passages 10, 11, and 12 are also provided in the casing of the chamber N for the purposes that will be hereinafter described. In the cylinder K is a piston S, secured to the piston-rod S' and normally pressed upward by means of the spring $S^2$, the lower end of which spring bears against a stop T, fast to the casing K', in which the double toggle-switch is mounted. This stop has a feather $t$, which engages in a keyway in the piston-rod S', and thus holds the same against turning under the influence of the springs $S^2$ and $u\,u$. The toggle-switch comprises arms U, with springs $u$, frame U', the double switch-blades V, contact-pieces W, mounted on the slate slab X, and the binding-posts Y and Y'. The conductors L and L' from the generator enter the casing K' through two of the stuffing-boxes $k'$ and are connected to the binding-posts Y, while the conductors M and M' from the switch to the motor are connected to the binding-posts Y' and pass through the other two stuffing-boxes $k'$. The bottom of the casing K' may be closed by a plate $K^3$ and screws $k^3$. The whole is preferably made air-tight to avoid corrosion of the parts from exposure to the atmosphere.

The operation of the device is as follows: Suppose the pressure in the reservoir F to have fallen low enough to start the motor running, which may be when the pressure in the reservoir F is near eight hundred and fifty pounds. The valve P would then be pressed on its seat and the valve P' off its seat, the tension of the springs R and of the reservoir-pressure on the diaphragms O and O' being so adjusted that this would take place when the pressure falls to about the limit stated. At this time if any fluid under pressure does leak from the opening 6 in the chamber N past the valve-seat $p^2$ it will go through the passages 7, 8, 10, and 11 and passing the valve-seat $p^3$ will escape to the atmosphere through the outlet 12. Now if no fluid is drawn from the receiver F the pressure therein will gradually rise until approximately the higher limit is reached, when the pressure on the diaphragms O and O' will press down both of the valves P and P', moving the valve P off its seat and forcing the valve P' down on its seat. At this time the passage to the outlet 12 will be closed, and the pressure going through the inlet 6 and passing through the passages 7 and 8 will enter the passage 9 and pass into the cylinders K above the piston S. This pressure will force the toggle down, compressing the springs $u$ until the arms U pass below the center, when the effect of the springs $u$ will be to suddenly lift the blades V clear of the contacts W, breaking the circuit from the generator to the motor in a manner such as will avoid sparking and burning of contacts. The motor will now stop and remain stopped until enough fluid is drawn off from the receiver to bring the pressure in the receiver to about the lower limit, when the springs R will cause the diaphragms O and O' to move upward again, allowing the valve P to find its seat and the valve P' to be lifted clear of its seat and permitting the fluid from the top of the cylinder K to pass through the opening 9 into the passage 8 and from this passage down through the passages 10, 11, and 12 to the atmosphere. The piston S now being relieved from pressure is forced upward by means of the spring $S^2$, restoring the toggle to the position shown in Fig. 2 and causing the knife-blades V to once more and suddenly complete the circuit, and thus will start up the motor again, and the process of recharging the receiver will recommence.

It will be seen that the motor A will be automatically started and stopped whenever the pressure in the receiver F falls below or rises above approximately the predetermined limits.

The casing K' may be connected to other parts of the apparatus in any convenient way, as by means of the clamp $K^2$, and suitable pressure-gages Z may be provided at desired points.

It will be obvious that a steam or other throttle-valve may be operated by the valve arrangement herein described instead of the electric switch, and thus motive power, not electric, may be cut off from or turned onto the compressor.

It will be obvious that various modifications of the herein-described apparatus may be made which could be used without departing from the spirit of my invention.

Having thus described my invention, what I claim, and desire to secure by Letters Patent of the United States, is—

1. In an apparatus of the character described, the combination with a receiver and a compressor, of an electric motor for operating said compressor, a switch for throwing said motor in and out of circuit with the source of electricity, and means automatically controlled by the rise or fall of pressure in said receiver for operating said switch, comprising valve mechanism operated by said rise and fall of pressure, a piston operated by the fluid controlled by said valve mechanism, and a toggle-joint with spring-impressed arms, and contact-blades operated by said arms, substantially as described.

2. In an apparatus of the character described, the combination with a receiver and a compressor, of an electric motor for operating said compressor, a switch for throwing said motor in and out of circuit with the source of electricity, diaphragms automatically controlled by the rise or fall of pressure in said receiver, valve mechanism operated by said diaphragms, a piston operated by the fluid controlled by said valve mechanism, and a toggle-joint with spring-impressed arms, and contact-blades operated by said arms, substantially as described.

3. In a pneumatic or fluid-pressure arrangement for operating switches, the combination with a pair of diaphragms and chambers therefor, and connections to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, a cylinder and piston, a switch operated by said piston, and ports controlled by the motion of said valves for admitting fluid-pressure to said cylinder, or for exhausting the same therefrom, substantially as described.

4. In a pneumatic arrangement for operating switches, the combination with a pair of diaphragms and chambers therefor, and connections to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, means for adjusting the tension on said springs, a cylinder and piston, a switch operated by said piston and ports controlled by the motion of said valves for admitting fluid-pressure to said cylinder, or for exhausting the same therefrom, substantially as described.

5. In a pneumatic arrangement for operating switches, the combination with a pair of diaphragms and chambers therefor, and connections to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, a cylinder and piston, a switch operated by said piston, a source of reduced fluid-pressure, and ports controlled by the motion of said valves for admitting said reduced fluid-pressure to said cylinder, or for exhausting the same therefrom, substantially as described.

6. In a pneumatic arrangement for operating switches, the combination with a pair of diaphragms and chambers therefor, and connections to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, means for adjusting the tension on said springs, a cylinder and piston, a switch operated by said piston, a source of reduced fluid-pressure, and ports controlled by the motion of said valves for admitting said reduced fluid-pressure to said cylinder, or for exhausting the same therefrom, substantially as described.

7. In a pneumatic arrangement for operating switches, the combination with a source of high fluid-pressure, and a source of lower fluid-pressure, of a pair of diaphragms and chambers therefor, and connections to the two sources of fluid-pressure leading to said chambers at opposite sides, respectively, of said diaphragms, valves bearing on the side of said diaphragms opposite the higher fluid-pressure, springs normally pressing said valves against the action of said diaphragms but yielding when the pressure on the diaphragms exceeds a predetermined limit, a cylinder and piston, a switch operated by said piston, and ports controlled by the motion of said valves for admitting the lower fluid-pressure to said cylinder, or for exhausting the same therefrom, substantially as described.

8. In a pneumatic arrangement for operating switches, the combination with a source of fluid-pressure, and a source of reduced fluid-pressure, of a pair of diaphragms and chambers therefor, and connections to the source of higher fluid-pressure leading to said chambers at one side of said diaphragms, and connections to the source of reduced fluid-pressure leading to said chambers at the opposite side of said diaphragms, valves bearing on the opposite side of said diaphragms, springs normally pressing said valves against the action of said diaphragms but yielding when the pressure on said diaphragms exceeds a predetermined limit, means for adjusting the tension on said springs, a cylinder and piston, a switch operated by said piston and ports controlled by the motion of said valves for admitting fluid-pressure to said cylinder, or for exhausting the same therefrom, substantially as described.

9. In a pneumatic arrangement for operating switches, the combination with a source of fluid-pressure, and a source of reduced fluid-pressure, of a pair of diaphragms and chambers therefor, and connections to the source of higher fluid-pressure leading to said chambers at one side of said diaphragms, and connections to the source of reduced fluid-pressure leading to said chambers at the opposite side of said diaphragms, valves bearing on the opposite side of said diaphragms, springs normally pressing said valves against the action of said diaphragms but yielding when the pressure on said diaphragms exceeds a predetermined limit, a toggle-lever operated by said piston, a double-blade switch operated by said toggle-lever, and ports controlled by the motion of said valves for admitting the reduced fluid-pressure to said cylinder, or for exhausting the same therefrom, substantially as described.

10. In a pneumatic arrangement for operating switches, the combination with a source of fluid-pressure, of a pair of diaphragms and chambers therefor, and connections to the source of fluid-pressure leading to said chambers at one side of said diaphragms, valves bearing on the opposite side of said diaphragms, springs normally pressing said valves against the action of said diaphragms but yielding when the pressure on the diaphragms exceeds a predetermined limit, means for adjusting the tension on said springs, a cylinder and piston, a toggle-joint operated by said piston, double-blade switches operated by said toggle-joint, a source of reduced fluid-pressure, and ports controlled by the motion of said valves for admitting said reduced fluid-pressure to said cylinder, or for exhausting the same therefrom, substantially as described.

11. In a pneumatic arrangement for regulating motors, the combination with a pair of diaphragms and chambers therefor, and connections to the source of fluid-pressure leading to said chambers at one side of said diaphragms, of valves bearing on the opposite side of said diaphragms, of springs normally pressing said valves against the action of said diaphragms but yielding when the pressure on the diaphragms exceeds a predetermined limit, a cylinder and piston, a cut-off operated by said piston, and ports controlled by the motion of said valves for admitting fluid-pressure to said cylinder, or for exhausting the same therefrom, substantially as described.

12. In a pneumatic arrangement for regulating motors, the combination with a pair of diaphragms and chambers therefor, and connections to the source of fluid-pressure leading to said chambers at the side of said diaphragms, of valves bearing on the opposite side of said diaphragms, springs normally pressing said valves against the action of said diaphragms but yielding when the pressure on the diaphragms exceeds a predetermined limit, means for adjusting the tension on said springs, a cylinder and piston, a cut-off operated by said piston, and ports controlled by the motion of said valves for admitting fluid-pressure to said cylinder, or for exhausting the same therefrom, substantially as described.

13. In a pneumatic arrangement for regulating motors, the combination with a pair of diaphragms and chambers therefor, and connectious to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, a cylinder and piston, a cut-off operated by said piston, a source of reduced fluid-pressure, and ports controlled by the motion of said valves for admitting said reduced fluid-pressure to said cylinder, or for exhausting the same therefrom, substantially as described.

14. In a pneumatic arrangement for regulating motors, the combination with a pair of diaphragms and chambers therefor, and connections to the source of fluid-pressure leading to said chambers at one side of said diaphragms, of valves bearing on the opposite side of said diaphragms, springs normally pressing said valves against the action of said diaphragms but yielding when the pressure on the diaphragms exceeds a predetermined limit, means for adjusting the tension on said springs, a cylinder and piston, a cut-off operated by said piston, a source of reduced fluid-pressure, and ports controlled by the motion of said valves for admitting said reduced fluid-pressure to said cylinder, or for exhausting the same therefrom, substantially as described.

In testimony whereof I affix my signature in presence of two witnesses.

WILLIAM BARNUM COWLES.

Witnesses:
  M. J. RUDOLPH,
  C. C. PRESCOTT.